United States Patent
Majure

(10) Patent No.: US 11,495,072 B2
(45) Date of Patent: Nov. 8, 2022

(54) TIME OUT BOX

(71) Applicant: Nathan Addison Majure, Denver, CO (US)

(72) Inventor: Nathan Addison Majure, Denver, CO (US)

(*) Notice: Subject to any disclaimer, the term of this patent is extended or adjusted under 35 U.S.C. 154(b) by 0 days.

(21) Appl. No.: 17/717,572

(22) Filed: Apr. 11, 2022

(65) Prior Publication Data

US 2022/0327876 A1 Oct. 13, 2022

Related U.S. Application Data

(60) Provisional application No. 63/173,249, filed on Apr. 9, 2021.

(51) Int. Cl.
*G07C 9/00* (2020.01)
*H04W 4/80* (2018.01)

(52) U.S. Cl.
CPC ..... *G07C 9/00896* (2013.01); *G07C 9/00309* (2013.01); *H04W 4/80* (2018.02); *G07C 2009/00769* (2013.01)

(58) Field of Classification Search
CPC ............ G07C 9/00896; G07C 9/00309; G07C 2009/00769; H04W 4/80
See application file for complete search history.

(56) References Cited

U.S. PATENT DOCUMENTS

| | | | |
|---|---|---|---|
| 8,491,192 B2* | 7/2013 | Brensinger | E04H 15/54 383/105 |
| 10,405,622 B2 | 9/2019 | Nash | |
| 10,937,001 B1* | 3/2021 | Isgar | A45C 11/00 |
| 2007/0018791 A1* | 1/2007 | Johnson | G07C 9/00571 340/5.73 |
| 2008/0191867 A1* | 8/2008 | Markovich | G07C 9/00912 340/539.11 |
| 2017/0332757 A1* | 11/2017 | Nash | A45C 11/00 |
| 2019/0100943 A1* | 4/2019 | Henricks | E05B 73/00 |

OTHER PUBLICATIONS

Faraday Box, Retrieved from Internet, Retrieved on Mar. 22, 2021 <URL: http://www.tufftoybox.com/product/faraday-box/>.
Build your own stylish signal blocking smartphone box in ten minutes, Retrieved from Internet, Retrieved on Mar. 22, 2021 <URL: https://scottiestech.info/2017/03/10/build-your-own-stylish-signal-blocking-smartphone-box-in-ten-minutes/>.
Signal Blocker Box, Retrieved from Internet, Retrieved on Mar. 22, 2021.

\* cited by examiner

*Primary Examiner* — Nabil H Syed

(57) ABSTRACT

A wireless signal blocking lockbox comprises a housing and a locking mechanism is presented. The housing comprises an access panel, a plurality of layers, and a storage body. The plurality of layers comprises an outer layer, a wireless signal blocking layer, and an inner layer. The access panel and the storage body are selectively connected to each other through the locking mechanism. The plurality of layers is distributed about the housing. The wireless signal blocking layer is positioned between the outer layer and the inner layer.

9 Claims, 3 Drawing Sheets

TIME OUT BOX

FIELD OF THE INVENTION

The present invention relates to signal blocking spaces. More specifically, the present invention relates to a wireless signal blocking lockbox.

BACKGROUND OF THE INVENTION

Checking our phones has become a daily habit where people end up spending countless hours on their phones and other electronic devices instead of interacting with the people around them. On average people spend about four hours a day on just their phones. While using electronic devices has various benefits to help people become more productive and connect with other people easier, it must be noted that phones and other electronic devices can cause a huge distraction. Lots of the time when used excessively a phone can prove to be more of a distraction than a tool that can be used productively. In order to take time away from electronic devices and specifically phones many people have created various ways to limit our phone use. One method to limit phone use is by turning it off and placing it out of the general vicinity. This method only works as long as the individual has developed their self-restraint and can be trusted not to turn their phone back on while performing a task. Another more recent effort to limit the amount of time spent on our phones is the development of various applications that limit the use of certain applications on an electronic device. The issue with these apps is that they only limit the use of certain aspects within a phone and cannot fully limit the use of the phone as a whole.

An objective of the present invention is to provide users with a device that limits all phone interaction. The present invention intends to provide users with a device that can block out cellular and internet signals and keep the phone away from the user for a specified amount of time. In order to accomplish that, a preferred embodiment of the present invention comprises a phone box, a plastic case, and an aluminum case. Further, the aluminum case blocks any cellular or internet signals from reaching the phone or electronic device within the phone box. Thus, the present invention is a box that blocks cellular signals from reaching a phone to allow the user to detach from their electronic device for a specified amount of time in order to interact with the physical world around them.

SUMMARY OF THE INVENTION

The present invention is a box to hold a phone or electronic device. The present invention seeks to provide users with a device that can block cellular signals to limit the desire of phone usage. In order to accomplish this the present invention comprises a phone box that houses all the components of the present invention and physically locks the phone placed within. Further, the plastic case is a protective liner within the phone box that surrounds the phone. Additionally, the aluminum case blocks out any cellular signals or internet capabilities to ensure that the phone cannot be used. Thus, the present invention is a box that blocks cellular signals from reaching a phone to allow the user to detach from their electronic device for a specified amount of time in order to interact with the physical world around them.

The present invention is a wireless signal blocking lockbox comprises a housing and a locking mechanism. The locking mechanism comprises a first locking element, a second locking element, and a releasing element. The housing comprises an access panel, a plurality of layers, and a storage body. The plurality of layers comprises an outer layer, a wireless signal blocking layer, and an inner layer. The access panel and the storage body are selectively connected to each other through the locking mechanism. The first locking element is connected adjacent to the access panel. The second locking element is connected adjacent to the storage body. The first locking element and the second locking element is selectively engaged to each other through the releasing element, where the first locking element is configured to selectively engage the second locking element through a closed configuration and an open configuration through the releasing element. The plurality of layers is distributed about the housing. The wireless signal blocking layer is positioned between the outer layer and the inner layer.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

Figure 1:
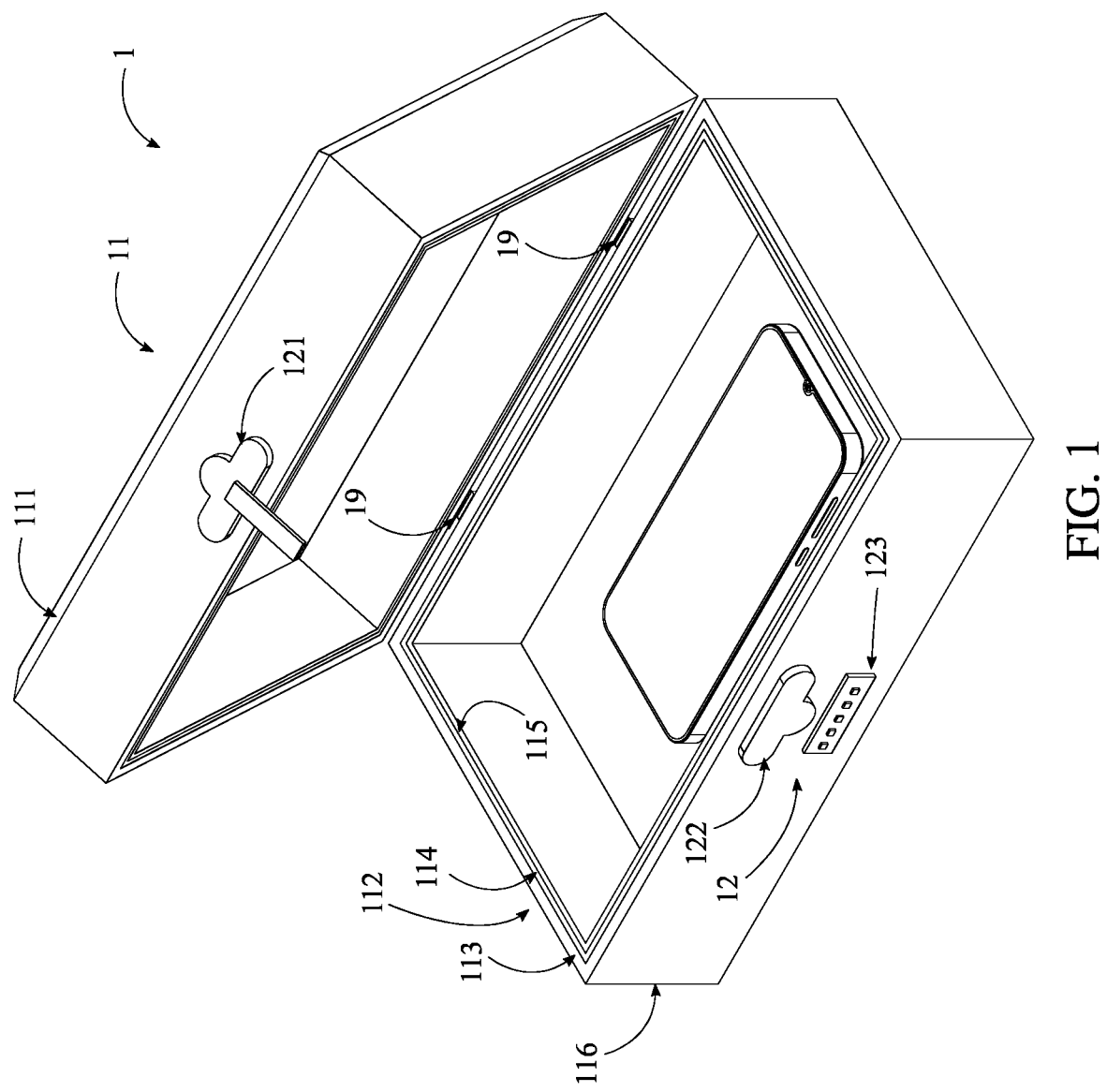
FIG. 1 is a top perspective view of the present invention that shows a lockbox in an open configuration.
Figure 2:
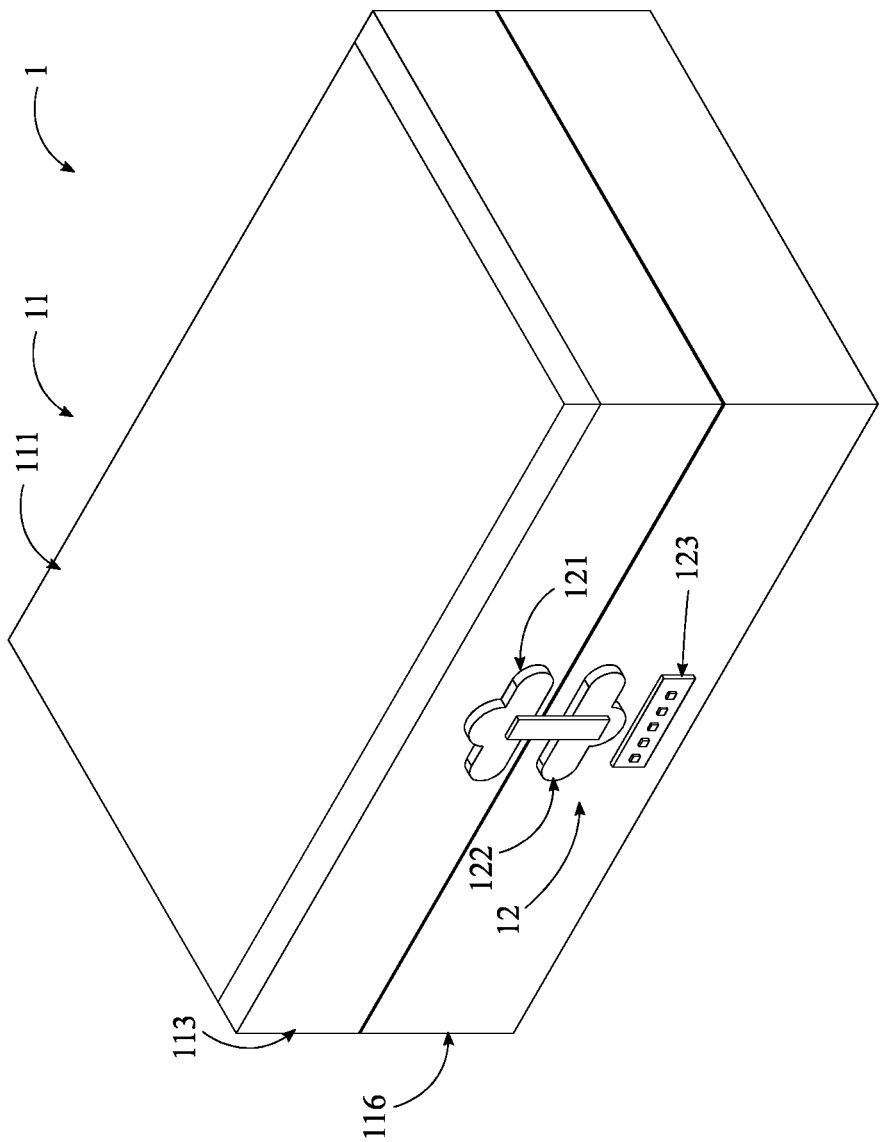
FIG. 2 is a top perspective view of the present invention that shows a lockbox in a closed configuration.

In reference to FIGS. 1-2, the present invention is a wireless signal blocking lockbox 1 comprises a housing 11 and a locking mechanism 12. The locking mechanism 12 comprises a first locking element 121, a second locking element 122, and a releasing element 123. The housing 11 comprises an access panel 111, a plurality of layers 112, and a storage body 116. The plurality of layers 112 comprises an outer layer 113, a wireless signal blocking layer 114, and an inner layer 115. The access panel 111 and the storage body 116 are selectively connected to each other through the locking mechanism 12. The first locking element 121 is connected adjacent to the access panel 111. The second locking element 122 is connected adjacent to the storage body 116. The first locking element 121 and the second locking element 122 is selectively engaged to each other through the releasing element 123, where the first locking element 121 is configured to selectively engage the second locking element 122 through a closed configuration and an open configuration through the releasing element 123. The plurality of layers 112 is distributed about the housing 11. The wireless signal blocking layer 114 is positioned between the outer layer 113 and the inner layer 115. In the preferred embodiment, the housing 11 takes the form of any suitable enclosure suitable for storing wireless electronic devices within the housing 11. In the preferred embodiment, the housing 11 is scaled to accommodate conventional smartphone-sized wireless electronic devices. In another embodiment, the housing 11 is scaled to accommodate conventional tablet-sized wireless electronic devices. In various embodiments, the housing 11 is scaled to various sizes to accommodate various applications of storing various wireless electronic devices. Stored wireless electronic devices may include but are not limited to server computers, routers, radio transmitters, or any other suitable wireless electronic device. In the preferred embodiment, the housing 11 serves as the main chassis of the wireless signal blocking lockbox 1 that secures the components the constitutes the wireless signal blocking lockbox 1.

In the preferred embodiment, the access panel 111 detaches from the storage body 116, allowing the user to store or access the wireless electronic devices within the storage body 116. In the preferred embodiment, the storage body 116 takes the form of any suitable receptacle implement that allows the user to store and secure wireless electronic devices within the housing 11. In the preferred embodiment, the plurality of layers 112 takes the form of constructive layers that constitute the form and structure of the housing 11. The outer layer 113 takes the form of the outermost construction of the housing 11 that serves as the protective and structural shell of the housing 11, protecting and securing the contents secured within the housing 11. In the preferred embodiment, the outer layer 113 is made out of a rigid material, such as, but not limited to wood, stainless steel, aluminum, polymer, or any other suitable material. In the preferred embodiment, the wireless signal blocking layer 114 takes the form of the intermediary layer protected by the outer layer 113 and the inner layer 115. More specifically, the wireless signal blocking layer 114 serves as the layer that actively blocks wireless signals from entering in or out of the housing 11. More specifically, the wireless electronic devices stored within the housing 11 cannot send or receive wireless signals when the housing 11 is configured in the closed configuration. In the preferred embodiment, the wireless signal blocking layer 114 is made out of aluminum but may be made out of any other suitable signal blocking material, such as, but not limited to copper, tin, silver, or any other suitable signal blocking material. In the preferred embodiment, the inner layer 115 is made out of a soft material suitable for protecting the wireless electronic devices stored within the housing 11. In the preferred embodiment, the inner layer 115 is made out of any suitable soft material, such as, but not limited to fabric, foam padding, silicone, rubber, or any other suitable material.

In the preferred embodiment, the locking mechanism 12 takes the form of any suitable mechanical or electronic locking mechanism 12 that locks the access panel 111 to the storage body 116 in the closed configuration. In one embodiment, the locking mechanism 12 takes the form of a mechanical latch-style locking mechanism 12. In another embodiment, the locking mechanism 12 takes the form of an electromagnetic-style locking mechanism 12. In the preferred embodiment, the first locking element 121 takes the form of one part of the locking mechanism 12 that is connected to the access panel 111. The second locking element 122 takes the form of the other part of the locking mechanism 12 that is connected to the storage body 116. In the preferred embodiment, the releasing element 123 takes the form of any suitable releasing implement that unlocks the first locking element 121 from the second locking element 122 such that the housing 11 assumes the open configuration, allowing the user to access the storage body 116. In the preferred embodiment, the releasing element 123 takes the form of a mechanical or electronic key corresponding to the type of locking mechanism 12. In one embodiment, the releasing element 123 takes the form of a mechanical key. In various embodiments, the releasing element 123 takes the form of any other suitable releasing implement, such as, but not limited to combination keys, verbal or non-verbal password-actuated keys, biometric key system, or any other suitable releasing implement.

Figure 3:
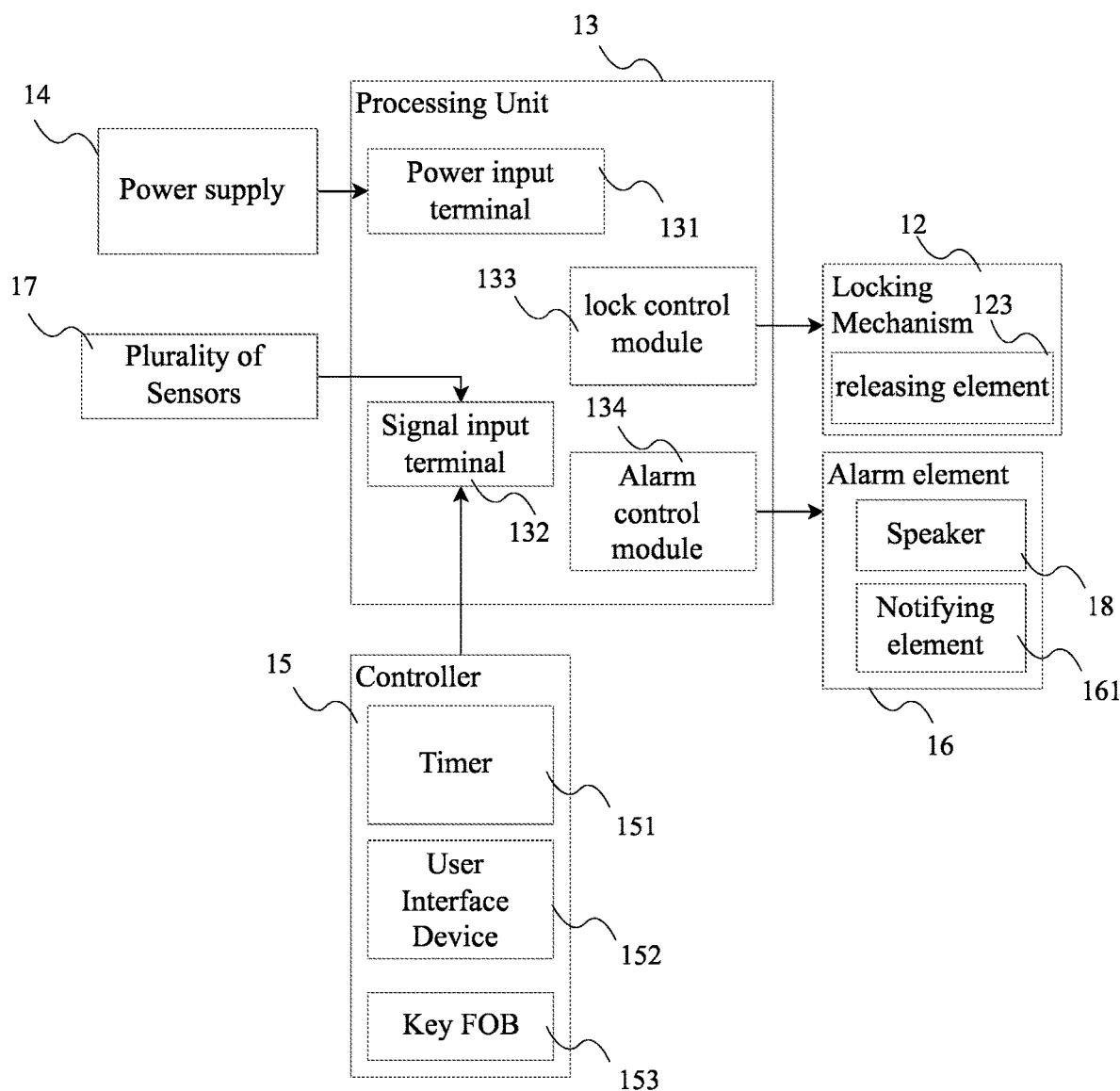
FIG. 3 is a circuit diagram used in the present invention.

In reference to FIG. 3, the wireless signal blocking lockbox 1 further comprises a processing unit 13, a power supply 14, and a controller 15. The processing unit 13 comprises a power input terminal 131, a signal input terminal 132, and a lock control module 133. The power input terminal 131, the signal input terminal 132, and the lock control module 133 are electronically connected to the processing unit 13. The power supply 14 is electrically connected to the power input terminal 131. The controller 15 is electronically connected to the signal input terminal 132, where the controller 15 is configured to operatively engage the locking mechanism 12 to the open configuration. In the preferred embodiment, the processing unit 13 takes the form of any suitable processor that handles and manages all electrical and electronic functions associated with the wireless signal blocking lockbox 1. In the preferred embodiment, the power input terminal 131 serves as the main power input for the power supply 14 that handles voltage regulating parameters. In the preferred embodiment, the power supply 14 takes the form of any suitable power supply 14, such as, but not limited to disposable batteries, rechargeable batteries, DC input power supply 14, or any other suitable power supply 14 that provides electrical power to the wireless signal blocking lockbox 1. In the preferred embodiment, the controller 15 takes the form of any suitable controlling device that allows the user to operatively engage the locking mechanism 12 to the open configuration. More specifically, the controller 15 communicates with the processing unit 13 through the signal input terminal 132, where the signal input terminal 132 may take the form of a direct feed or wireless transmitting module. The input signals received from the controller 15 then electronically communicates with the lock control module 133, where the lock control module 133 unlocks the locking mechanism 12 such that the housing 11 assumes an open configuration.

In reference to FIG. 3, the controller 15 comprises a timer 151. The timer 151 is electronically connected to the controller 15, where the timer 151 is configured to operatively engage the locking mechanism 12 to the open configuration through a specified duration of time. In the preferred embodiment, the timer 151 takes the form of a time-actuated switch that opens the locking mechanism 12 over the specified duration of time that the user sets. In one embodiment, the specified duration of time takes the form of a countdown time sequence. In another embodiment, the specified duration of time takes the form of a set specific date and time.

In reference to FIG. 3, the controller 15 further comprises a user interface device 152. The user interface device 152 is in electronic communication to the controller 15, where the user interface device 152 is configured to operatively engage the locking mechanism 12 to the open configuration. In the preferred embodiment, the user interface device 152 takes the form of any suitable wireless communication device that links directly to the controller 15. This allows the user to link a smartphone or any other suitable device to the controller 15, allowing the user to unlock the locking mechanism 12.

In reference to FIG. 3, the controller 15 further comprises a key fob 153. The key fob 153 is in electronic communication to the controller 15, where the key fob 153 is configured to operatively engage the locking mechanism 12 to the open configuration. In the preferred embodiment, the key fob 153 takes the form of any suitable electronic key device that unlocks the locking mechanism 12. In reference to FIG. 3, the wireless signal blocking lockbox 1 further comprises an alarm element 16, a plurality of sensors 17, and a speaker 18. The processing unit 13 further comprises an alarm control module 134. The alarm control module 134 is electronically connected to the processing unit 13. The plurality of sensors 17 is electronically connected to the signal input terminal 132. The speaker 18 is electronically connected to the alarm element 16. In the preferred embodiment, the alarm element 16 takes the form of any suitable electronic alarming system connected to the alarm control module 134. In the preferred embodiment, the plurality of sensors 17 serves as feedback sensors that are in communication with the alarm element 16. More specifically, the plurality of sensors 17 takes the form of magnetic contact sensors placed along the first locking element 121 and the second locking element 122. The magnetic contact sensors are only activated when the housing 11 assumes the closed configuration. The displacement of these contact sensors when the housing 11 assumes the closed configuration will send a signal to the signal input terminal 132, where the signal input terminal 132 communicates with the processing unit 13 such that the processing unit 13 triggers the alarm element 16 which in turn activates the speaker 18. In the preferred embodiment, the speaker 18 takes the form of any suitable audio speaker 18 that emits an audible alarm, indicating that the housing 11 was tampered with.

In reference to FIG. 3, the alarm element 16 comprises a notifying element 161. The notifying element 161 is electronically connected to the alarm element 16. The user interface device 152 is in electronic communication to the controller 15. The notifying element 161 is in electronic communication with the user interface device 152. The notifying element 161 takes the form of a transmitting element that transmits a notification to the user interface device 152 that the controller 15 is paired with. More specifically, the broadcasted notification produced by the notification element takes the form of any suitable form of notification that communicates with any suitable user interface device 152. In various embodiments, the notification takes the form of SMS messages, application notifications, emails, or any other suitable notification. In reference to FIGS. 1-2, the access panel 111 is hingedly connected to the storage body 116 through a plurality of fastening elements 19. In the preferred embodiment, the plurality of fastening elements 19 takes the form of hinges.

Although the invention has been explained in relation to its preferred embodiment, it is to be understood that many other possible modifications and variations can be made without departing from the spirit and scope of the invention as hereinafter claimed.

What is claimed is:
1. A wireless signal blocking lockbox comprising:
   a housing;
   a locking mechanism;
   the locking mechanism comprising a first locking element, a second locking element, and a releasing element;
   the housing comprising an access panel, a plurality of layers, and a storage body;
   the plurality of layers comprising an outer layer, a wireless signal blocking layer, and an inner layer;
   the access panel and the storage body being selectively connected to each other through the locking mechanism;
   the first locking element being connected adjacent to the access panel;
   the second locking element being connected adjacent to the storage body;
   the first locking element and the second locking element being selectively engaged to each other through the releasing element, wherein the first locking element is configured to selectively engage the second locking element through a closed configuration and an open configuration through the releasing element;
   the plurality of layers being distributed about the housing;
   the wireless signal blocking layer being positioned between the outer layer and the inner layer;
   a processing unit;
   a power supply;
   a controller;
   the processing unit comprising a power input terminal, a signal input terminal, and a lock control module;
   the power input terminal, the signal input terminal, and the lock control module being electronically connected to the processing unit;
   the power supply being electrically connected to the power input terminal;
   the controller being electronically connected to the signal input terminal, wherein the controller is configured to operatively engage the locking mechanism to the open configuration;
   the controller comprising a timer; and
   the timer being electronically connected to the controller, wherein the timer is configured to operatively engage the locking mechanism to the open configuration through a specified duration of time.

2. The wireless signal blocking lockbox as claimed in claim 1 comprising:
   the controller comprising a user interface device; and
   the user interface device being in electronic communication to the controller, wherein the user interface device is configured to operatively engage the locking mechanism to the open configuration.

3. The wireless signal blocking lockbox as claimed in claim 1 comprising:
   the controller comprising a key fob; and
   the key fob being in electronic communication to the controller, wherein the key fob is configured to operatively engage the locking mechanism to the open configuration.

4. The wireless signal blocking lockbox as claimed in claim 1 comprising:
   an alarm element;
   a plurality of sensors;
   a speaker;
   the processing unit further comprising an alarm control module;
   the alarm control module being electronically connected to the processing unit;
   the plurality of sensors being electronically connected to the signal input terminal; and
   the speaker being electronically connected to the alarm element.

5. The wireless signal blocking lockbox as claimed in claim 4 comprising:

The controller comprising a user interface device;

The alarm element comprising a notifying element; and the notifying element being electronically connected to the alarm element;

the user interface device being in electronic communication to the controller; and the notifying element being in electronic communication with the user interface device.

6. The wireless signal blocking lockbox as claimed in claim 1 comprising:

the access panel being hingedly connected to the storage body through a plurality of fastening elements.

7. The wireless signal blocking lockbox as claimed in claim 1, wherein the outer layer is made out of a rigid material.

8. The wireless signal blocking lockbox as claimed in claim 1, wherein the wireless signal blocking layer is made out of aluminum.

9. The wireless signal blocking lockbox as claimed in claim 1, wherein the inner layer is made out of a soft material.

* * * * *